Sept. 11, 1956   D. P. LITZENBERG   2,762,311
MOTOR DRIVEN PUMPS
Filed Oct. 1, 1952

*INVENTOR.*
DAVID P. LITZENBERG
BY
ATTORNEY.

United States Patent Office 2,762,311
Patented Sept. 11, 1956

2,762,311

MOTOR DRIVEN PUMPS

David P. Litzenberg, Philadelphia, Pa., assignor to Zenith Engineering Corporation, Philadelphia, Pa., a corporation of Pennsylvania Application October 1, 1952, Serial No. 312,490

9 Claims. (Cl. 103—87)

This invention relates to motor driven pumps.

It is the principal object of the present to provide a motor driven pump having an improved character of isolation of the rotor chamber.

It is a further object of the present invention to provide a motor driven pump which is simple in construction, has a relatively small number of parts, which may be readily assembled and disassembled as required and which may be constructed at relatively low cost.

It is a further object of the present invention to provide a motor driven pump having improved provisions for noise isolation and in which electrolytic action in the motor rotor chamber is eliminated.

It is a further object of the present invention to provide a motor driven pump having an improved character of resilient mounting which permits independent insertion and removal of the operating part of the unit and movement of the unit during operation without disturbing the alinement of the rotor.

It is a further object of the present invention to provide a motor driven pump having an improved bearing construction which permits of mounting the motor in any desired position for operation while retaining self-lubricating characteristics.

Other objects and advantageous features of the invention will be apparent from the specification and claims.

Figure 1:
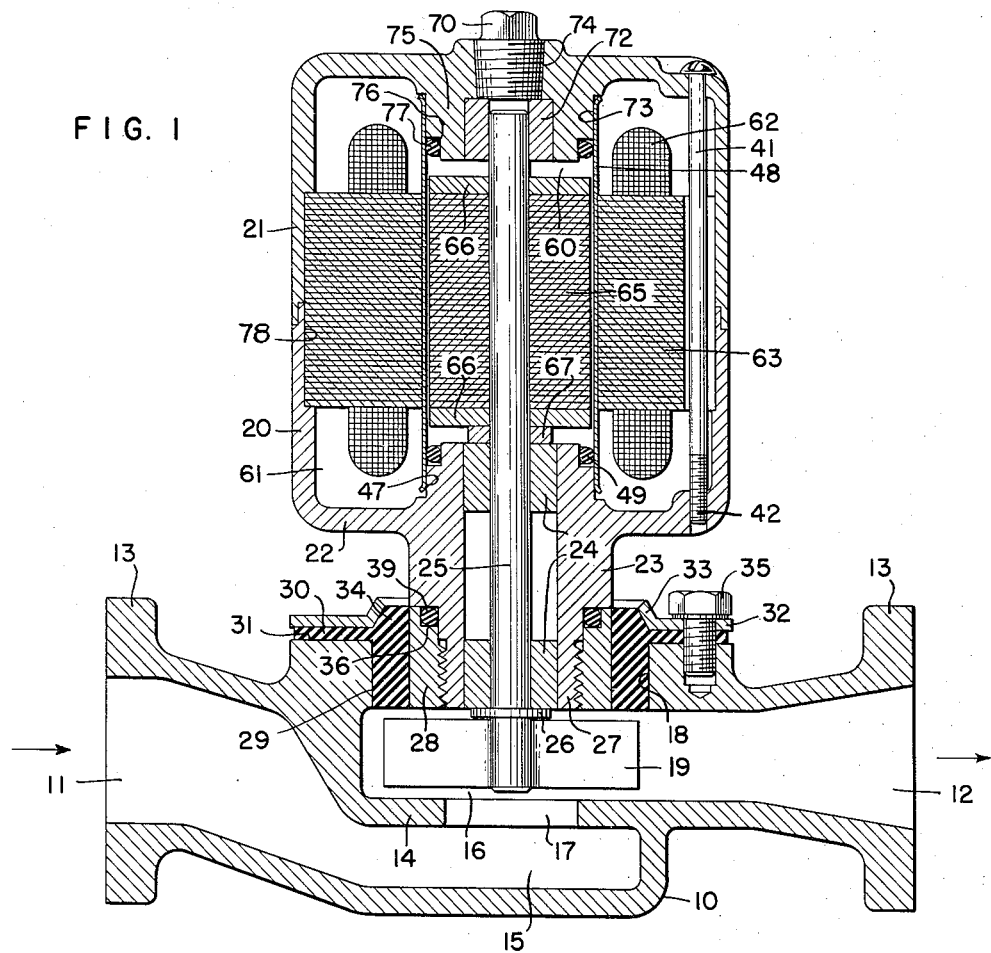
Figure 2:
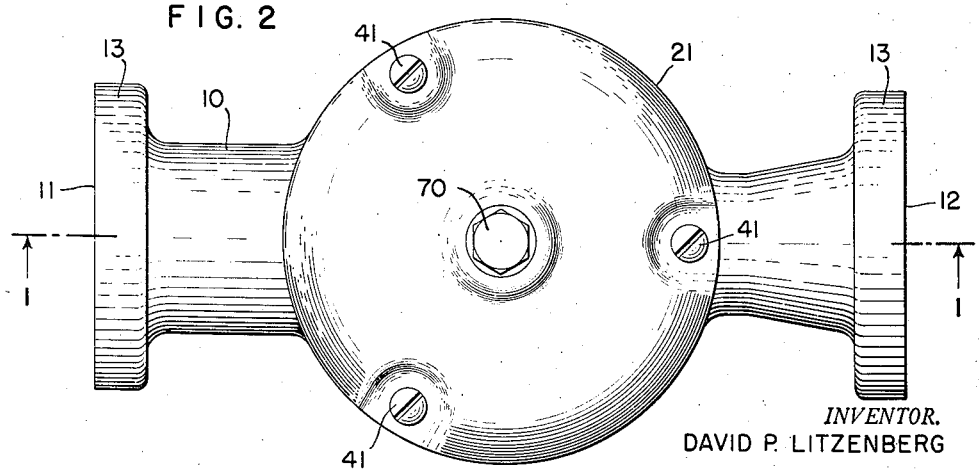

The nature and characteristic features of the invention will be more readily understood from the following description, taken in connection with the accompanying drawings forming part hereof, in which:

Figure 1 is a vertical central sectional view of a motor driven pump in accordance with the invention, taken approximately on the line 1—1 of Fig. 2; and Fig. 2 is a top plan view of the motor driven pump shown in Fig. 1.

It should, of course, be understood that the description and drawings herein are illustrative merely and that various modifications and changes can be made in the structure disclosed without departing from the spirit of the invention.

Referring now more particularly to the drawings, in which a preferred embodiment of the invention is illustrated, a pump housing is shown at 10 and has an inlet 11 and an oppositely disposed outlet 12, the housing 10 having flanges 13 for attachment into the fluid line (not shown) in which the motor pump is to be employed.

The housing 10 is provided with a central transverse wall 14 which separates an inlet chamber 15 from a pump chamber 16, the wall 14 having an inlet opening 17 therethrough for the passage of fluid. The pump chamber 16 is in direct and free communication with the outlet 12. The housing 10 is provided with an opening 18 for the reception of the pump rotor 19 as hereinafter explained.

The motor includes a motor housing having an inner closed cylindrical portion 20 and an outer closed cylindrical portion 21 interengaged therewith. The housing portion 20 is connected by a transverse wall 22 to a central hollow cylindrical bearing supporting portion 23, the cylindrical portion 23 having fixed in the interior thereof, spaced bearings 24 for supporting a shaft 25. On the outer or free end of the shaft 25 the pump rotor 19 is mounted. The bearings 24 may be of any desired type but are preferably of carbon so as to be lubricated by liquid in contact therewith.

A spacer disc 26 is provided on the shaft 25 between the pump rotor 19 and the outermost of the bearings 24.

The central portion 23 is provided with a threaded end 27 for the reception of a metallic mounting ring 28 on the periphery of which a rubber ring 29 is vulcanized or otherwise integrally secured in fluid tight relation.

The ring 29 has an outwardly extending flange 30 for engagement with an outer face 31 of the pump housing 10 and a clamping ring 32 having a frusto-conical section 33 in engagement with a complemental portion 34 of the ring 29 which is provided for clamping the assembly in position by means of studs 35 at predetermined spaced locations.

Interposed between the central portion 23 and the mounting ring 28, and preferably in a suitable recess 36 formed in the mounting ring 28, a packing 39 is provided. While any suitable packing may be employed, it is preferred to use a packing of the type known as an O-ring.

The two part construction of the motor housing permits of access, if desired, to interior portions of the motor housing, the housing portions 20 and 21 preferably being held in engagement with each other by spaced studs 41 having threaded ends 42 engaging in the housing 20. At the center of the housing portion 21 an opening 74 is provided for the reception of a tapered plug 70, the plug 70 being axially disposed with respect to the shaft 25.

The central portion 23 has a cylindrical surface 47 formed thereon for the reception of a sealing cylinder or sleeve 48 preferably of non-magnetic material such as stainless steel, with which a packing 49, preferably an O-ring, is in engagement to provide a fluid tight joint at this location.

The interior of the housing section 21 is provided with a boss 75 having a cylindrical surface 73 for the reception of the upper end of the sleeve 48 to provide rigidity and alinement at this location. The boss 75 is provided, at the terminus of the surface 73 with a groove 76 for the reception of a packing 77, preferably an O-ring, to provide a fluid tight joint at this location.

A motor rotor chamber 60 is thus provided between the inner end of the central portion 23 and the inner end of the boss 75, within the interior of the cylindrical sleeve 48. A motor stator chamber 61 is provided in the interior space outside the sleeve 48 and within the housing portions 20 and 21.

Within the motor stator chamber 61, the motor windings 62 and field laminations 63 are provided, the field laminations 63 preferably being held in position by a suitable groove 78 in the interiors of the walls of the housing sections 20 and 21.

Within the motor rotor chamber 60, the motor rotor 65, is provided secured to the shaft 25, and may be of the short circuited type with end plates 66 and with a pressure ring 67 in engagement with the shaft 25 interposed between the innermost end plate 66 and the innermost bearing 24.

A bearing 72 is positioned in the interior of the boss 75 and is axially disposed with respect to the shaft 25 which it supports, to provide stability and alinement at this location.

The operation of the motor driven pump of the present invention will it is thought be clear from the foregoing description, but will be summarized briefly.

Alternating current is supplied from any suitable source to the windings 62 for effecting rotation of the motor rotor 65 and the shaft 25 connected thereto.

Fluid is introduced through the inlet 11 into the inlet chamber 15, and passes through the opening 17 in the transverse wall 14 into the pump chamber 16, where the fluid is acted upon by the pump rotor 19 and delivered to the outlet 12.

It will be noted that the entire operating or moving portion of the pump of the present invention may be readily removed from the pump housing 10 by removal of the studs 35, the opening 18 permitting easy withdrawal of the rotor 19.

Access to the sleeve 48 and to the windings 62 may also be had by removal of the studs 41.

With the motor pump unit secured in position by the bolts 35 a fluid tight joint is provided by compression of the ring 29 and the flange 30 by the clamping ring 32, thus preventing leakage at this location.

The packing ring 39 provides a seal against fluid leakage between the supporting portion 23 and the mounting ring 28.

Fluid passing from the pump chamber 16 through and past the bearings 24 is prevented from passing to the motor stator chamber 61 by the sealing ring 49 and the sealing ring 77.

The ring 29 also insulates the pump and motor assembly from any electrolytic action in the system in which the same is installed. The ring 29 also isolates and prevents the transmission of any noise and vibration from the motor or pump to the system in which it is installed.

I claim:

1. A motor driven pump comprising a pump housing having an inlet passageway, an outlet passageway, and a pumping chamber in communication with the said inlet and the said outlet passageways, said pump housing having an opening on one side of said pumping chamber, a motor housing having a motor stator therein and having a cylindrical portion extending into said opening, a ring member detachably secured to said cylindrical portion and having a resilient sleeve for engagement in said opening, means for clamping said sleeve in fluid tight engagement in said opening including a ring engaging said sleeve in spaced relation to said motor housing and holding members for said ring engaging said pump housing, a shaft journalled in said cylindrical portion, a motor rotor on said shaft and disposed in said motor housing within said stator, and an impeller on said shaft in said pumping chamber.

2. A motor driven pump comprising a pump housing having an inlet passageway, an outlet passageway and a pumping chamber in communication with the said inlet and the said outlet passageways, said pump housing having an opening on one side thereof in communication with said pumping chamber, a motor housing member having a cylindrical portion at one end thereof extending into said opening, said cylindrical portion having a threaded end, a ring in engagement with said threaded end, a resilient sleeve secured to said ring in fluid tight engagement, a sealing member interposed between said cylindrical portion and said ring, means for clamping said sleeve in fluid tight engagement in said opening, a motor stator in said motor housing member, a shaft, a motor rotor on said shaft within said motor stator, and an impeller on said shaft in said pumping chamber.

3. A motor driven pump comprising a pump housing having an inlet passageway, an outlet passageway, and a pumping chamber in communication with the said inlet and the said outlet passageways, said pump housing having an opening on one side of said pumping chamber, a motor housing having a motor stator therein and having a cylindrical bearing supporting portion extending into said opening in spaced relation thereto, an axially extending cylindrical sleeve of resilient material interposed in said opening between and in engagement with said cylindrical portion and said pump housing within said opening, means for clamping said sleeve in fluid tight engagement in said opening including a ring engaging said sleeve in spaced relation to said motor housing and holding members for said ring engaging said pump housing, a shaft journalled in said cylindrical portion, a motor rotor on said motor housing within said stator, and an impeller on said shaft in said pumping chamber.

4. A motor driven pump comprising a pump housing having an inlet passageway, an outlet passageway, and a pumping chamber in communication with the said inlet and the said outlet passageways, said pump housing having an opening on one side of said pumping chamber with a wall surrounding and extending outwardly from said opening, a motor housing having a motor stator therein and having a cylindrical bearing supporting portion extending into said opening in spaced relation thereto, an axially extending cylindrical sleeve of resilient material interposed in said opening between and in engagement with said cylindrical portion and said pump housing within said opening, said sleeve having a flange extending outwardly therefrom for engagement with said wall, means for clamping said sleeve in fluid tight engagement in said opening and said flange in engagement with said wall including a ring engaging said sleeve in spaced relation to said motor housing and holding members for said ring engaging said pump housing, a shaft journalled in said motor housing, a motor rotor on said shaft and disposed in said motor housing within said stator, and an impeller on said shaft in said pumping chamber.

5. A motor driven pump comprising a pump housing having an inlet passageway, an outlet passageway, and a pumping chamber in communication with the said inlet and the said outlet passageways, said pump housing having an opening on one side of said pumping chamber, a motor housing having a motor stator therein and having a cylindrical portion extending into said opening in spaced relation thereto, a cylindrical sleeve of resilient material surrounding said cylindrical portion and disposed in said opening in engagement therein with said cylindrical portion and said pump housing, means for clamping said sleeve in fluid tight engagement in said opening including a ring engaging said sleeve in spaced relation to said motor housing and holding members for said ring engaging said pump housing, a shaft journalled in said cylindrical portion, a motor rotor on said shaft and disposed in said motor housing within said stator, and an impeller on said shaft in said pumping chamber.

6. A motor driven pump comprising a pump housing having an inlet passageway, an outlet passageway, and a pumping chamber in communication with the said inlet and the said outlet passageways, said pump housing having an opening on one side of said pumping chamber, a motor housing having a motor stator therein and having a cylindrical portion extending into said opening in spaced relation thereto, a cylindrical sleeve of resilient material surrounding said cylindrical portion and disposed in said opening in engagement therein with said cylindrical portion and said pump housing, means for clamping said sleeve in fluid tight engagement in said opening including a ring engaging said sleeve in spaced relation to said motor housing and holding members for said ring engaging said pump housing, a shaft journalled in said cylindrical portion, a motor rotor on said shaft and disposed in said motor housing within said stator, and an impeller on said shaft of smaller diameter than said opening and insertable through said opening into said pumping chamber.

7. A motor driven pump comprising a pump housing having an inlet passageway, an outlet passageway and a pumping chamber in communication with the said inlet and the said outlet passageways, said pump housing having an opening on one side thereof in communication with said pumping chamber, a motor housing member having a cylindrical portion with one end thereof extending into said opening in spaced relation thereto and with an oppositely extending cylindrical boss, a cylindrical sealing sleeve of resilient material interposed between and in engagement with said cylindrical portion and said pump housing within said opening, a second motor housing member having an inwardly extending cylindrical boss, a cylindrical sleeve of non-magnetic material extending between said housing members and in engagement with the exteriors of said bosses and providing with the housing members a motor stator chamber, sealing members carried by said bosses and in engagement with said second sleeve for preventing access of fluid from said rotor chamber to said stator chamber, a shaft, spaced bearing members for said shaft in said cylindrical portion, bearing means for said shaft in said second motor housing member, a motor rotor carried by said shaft in said motor rotor chamber, and an impeller carried by said shaft in said pumping chamber.

8. A motor driven pump comprising a pump housing having an inlet passageway, an outlet passageway and a pumping chamber in communication with the said inlet and the said outlet passageways, said pump housing having an opening on one side thereof in communication with said pumping chamber, a motor housing member having a cylindrical portion with one end thereof extending into said opening in spaced relation thereto and with an oppositely extending cylindrical boss, a cylindrical sealing sleeve of resilient material interposed between and in engagement with said cylindrical portion and said pump housing within said opening, a second motor housing member having an inwardly extending cylindrical boss, a cylindrical sleeve of non-magnetic material extending between said housing members and in engagement with the exteriors of said bosses and providing with the housing members a motor stator chamber, the interior of said second sleeve providing with said housing members a closed motor rotor chamber, spaced sealing members carried by said bosses and in engagement with the interior wall of said second sleeve at locations spaced inwardly from the ends thereof for preventing access of fluid from said rotor chamber to said stator chamber, a shaft, bearing members for said shaft in said motor housing members, a motor rotor carried by said shaft in said motor rotor chamber, and an impeller carried by said shaft in said pumping chamber.

9. A motor driven pump comprising a pump housing having an inlet passageway, an outlet passageway, and a pumping chamber in communication with the said inlet and the said outlet passageways, said pump housing having an opening on one side thereof in communication with said pumping chamber, a motor housing member having a cylindrical portion with one end thereof extending into said opening in spaced relation thereto and with an oppositely extending cylindrical boss, a cylindrical sealing sleeve of resilient material interposed between and in engagement with said cylindrical portion and said pump housing within said opening, a second motor housing member having an inwardly extending cylindrical boss, a cylindrical sleeve of non-magnetic material extending between said housing members and in engagement with the exteriors of said bosses and providing with the housing members a motor stator chamber, the interior of said second sleeve providing with said housing members a closed motor rotor chamber, spaced sealing members carried by said bosses and in engagement with the interior wall of said second sleeve at locations spaced inwardly from the ends thereof for preventing access of fluid from said rotor chamber to said stator chamber, a shaft, spaced bearing members for said shaft in said cylindrical portion, bearing means for said shaft in the boss of said second motor housing member, a motor rotor carried by said shaft in said motor rotor chamber, and an impeller carried by said shaft in said pumping chamber.

References Cited in the file of this patent

UNITED STATES PATENTS

| | | |
|---|---|---|
| 2,108,734 | Van Sciver | Feb. 15, 1938 |
| 2,384,254 | Meredew | Sept. 4, 1945 |
| 2,459,036 | Lipe et al. | Jan. 11, 1949 |
| 2,517,233 | Peters | Aug. 1, 1950 |